United States Patent
Sethi

(10) Patent No.: US 12,126,684 B1
(45) Date of Patent: Oct. 22, 2024

(54) PUBLISHER-SUBSCRIBER MESSAGE MAPPING

(71) Applicant: Hewlett Packard Enterprise Development LP, Spring, TX (US)

(72) Inventor: Aseem Sethi, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/303,103

(22) Filed: Apr. 19, 2023

(51) Int. Cl.
*H04L 67/12* (2022.01)
*H04L 67/55* (2022.01)

(52) U.S. Cl.
CPC .............. *H04L 67/12* (2013.01); *H04L 67/55* (2022.05)

(58) Field of Classification Search
CPC ....... H04L 67/12; H04L 67/55; H04L 63/102; H04L 67/562; G06F 9/542; G06F 2221/2111; G06F 9/546; G06F 16/9035
See application file for complete search history.

(56) References Cited

U.S. PATENT DOCUMENTS

| | | | |
|---|---|---|---|
| 6,871,065 B2 | 3/2005 | Yamaguchi | |
| 7,680,951 B1 * | 3/2010 | Kulik | H04L 45/306 709/238 |
| 8,959,162 B2 * | 2/2015 | Bhogal | G06F 9/542 709/206 |
| 9,948,503 B2 | 4/2018 | Vedula | |
| 9,967,203 B2 | 5/2018 | Walkin et al. | |
| 9,989,938 B2 | 6/2018 | Ejiri et al. | |
| 10,649,824 B1 * | 5/2020 | Tan | G06F 9/542 |
| 10,778,455 B2 | 9/2020 | Soneda et al. | |
| 10,846,655 B2 | 11/2020 | Su | |
| 11,706,302 B1 * | 7/2023 | El-Azzami | H04L 67/143 709/203 |
| 2003/0068046 A1 * | 4/2003 | Lindqvist | H04N 21/6125 348/E7.071 |
| 2007/0208702 A1 | 9/2007 | Morris | |
| 2009/0086688 A1 * | 4/2009 | Kvache | H04L 65/1026 370/338 |
| 2017/0244657 A1 * | 8/2017 | Baldwin | H04L 51/212 |
| 2017/0364046 A1 * | 12/2017 | Westrick, Jr. | G05B 15/02 |

(Continued)

FOREIGN PATENT DOCUMENTS

| | | |
|---|---|---|
| WO | 2016013925 A1 | 1/2016 |
| WO | 2020182463 A1 | 9/2020 |

OTHER PUBLICATIONS

"Pub/Sub Messaging," Amazon Web Services, https://aws.amazon.com/pub-sub-messaging/, Downloaded Apr. 18, 2023, 5 pages.

(Continued)

*Primary Examiner* — Schquita D Goodwin
*Assistant Examiner* — Linh T. Nguyen
(74) *Attorney, Agent, or Firm* — Slater Matsil, LLP

(57) ABSTRACT

In an example implementation consistent with the features disclosed herein, publisher-subscriber message mapping is performed. A message is received from a publisher, with the message including a first topic. The first topic includes a gateway identifier of a gateway for the publisher. The gateway identifier is then mapped to a user identifier. The first topic of the message is modified to a second topic by replacing the gateway identifier with the user identifier. The message is then sent to a subscriber that is subscribed to the second topic.

20 Claims, 5 Drawing Sheets

(56) References Cited

U.S. PATENT DOCUMENTS

| | | | | |
|---|---|---|---|---|
| 2018/0167476 | A1* | 6/2018 | Hoffner | H04L 67/55 |
| 2019/0103173 | A1* | 4/2019 | Power | G16H 10/60 |
| 2019/0342170 | A1* | 11/2019 | Pathak | H04L 41/0869 |
| 2019/0356542 | A1* | 11/2019 | Chamarajnager | H04L 63/0823 |
| 2020/0067865 | A1* | 2/2020 | Jiménez | H04L 51/216 |
| 2020/0127911 | A1* | 4/2020 | Gilson | H04L 47/323 |
| 2020/0177461 | A1* | 6/2020 | Zhu | G06F 15/16 |
| 2020/0195740 | A1* | 6/2020 | Xu | H04L 67/56 |
| 2020/0366463 | A1 | 11/2020 | Falk | |
| 2021/0099386 | A1* | 4/2021 | Goel | H04L 67/10 |
| 2022/0309044 | A1* | 9/2022 | Trocki | G06F 16/212 |
| 2022/0368558 | A1* | 11/2022 | Ploegert | G06F 16/258 |
| 2023/0041490 | A1* | 2/2023 | Vangati | H04L 63/108 |
| 2023/0147370 | A1* | 5/2023 | Okamura | H04L 65/1073 709/201 |
| 2023/0403320 | A1* | 12/2023 | Novo Diaz | H04L 67/125 |

OTHER PUBLICATIONS

"Topic Rewrite," EMQX, https://www.emqx.io/docs/en/v5.0/advanced/topic-rewrite.html#/configure-topic-rewrite-rules, downloaded Apr. 18, 2023, 3 pages.

"What is Pub/Sub?" Google Cloud, https://cloud.google.com/pubsub/docs/overview, last updated Apr. 13, 2023, 8 pages.

The HiveMQ Team, "MQTT Topics, Wildcards, & Best Practices—MQTT Essentials: Part 5," HiveMQ, https://www.hivemq.com/blog/mqtt-essentials-part-5-mqtt-topics-best-practices/, Aug. 20, 2019, 26 pages.

* cited by examiner

PUBLISHER-SUBSCRIBER MESSAGE MAPPING

BACKGROUND

The Internet of things (IoT) is a system of diverse devices, such as computers, sensors, appliances, etc. Often IoT devices are embedded in real-world systems (e.g. factory assembly lines), have limited computational resources, and are located in edge network sites. In the IoT, devices communicate over a network, such as a local network or the internet. One technique for IoT device communication is publisher-subscriber messaging, which is an efficient, flexible, and scalable messaging protocol that allows IoT devices to communicate in a decoupled manner. An example of a publisher-subscriber messaging protocol is Message Queuing Telemetry Transport (MQTT). In publisher-subscriber messaging, devices act as message publishers and/or subscribers. Subscribers may filter messages from publishers so that a subscriber receives only a subset of published messages. One type of message filtering is topic-based filtering, in which a subscriber receives messages published on a desired topic.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
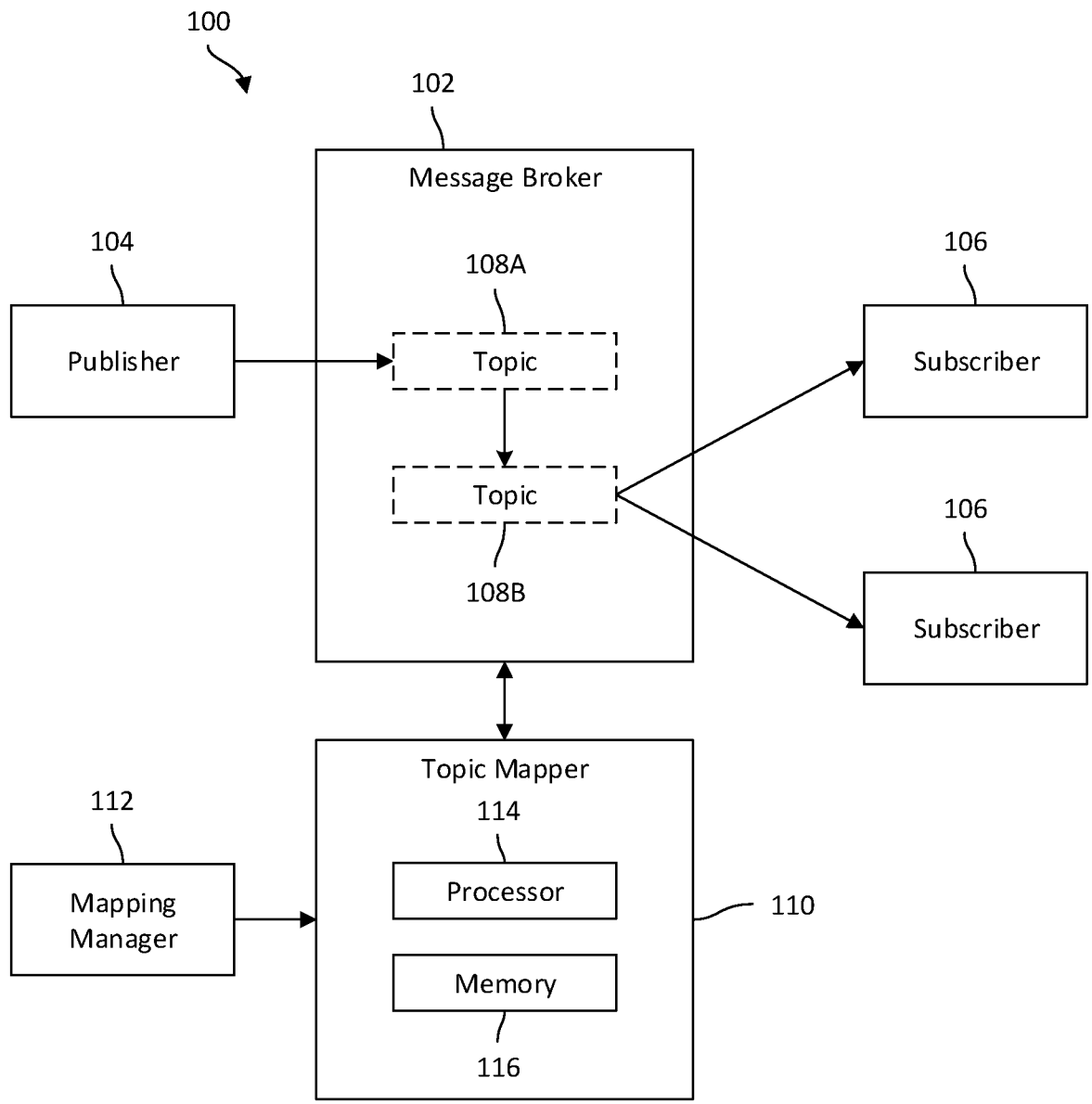
FIG. 1 is a block diagram of a publish-subscribe messaging system, according to some implementations.

The following disclosure provides many different examples for implementing different features. Specific examples of components and arrangements are described below to simplify the present disclosure. These are, of course, merely examples and are not intended to be limiting.

A publish-subscribe messaging system includes a message broker, one or more clients, and a topic mapper. The message broker is adapted to receive a message from a publishing client (e.g., a publisher) and route the message to one or more destination clients (e.g., subscribers). A message includes a topic and a payload, and one or more subscribers may be subscribed to a topic. When a publisher publishes a message on a topic, the message broker routes the message to the subscribers that are subscribed to that topic. A publisher may be a device that has limited computing resources. For example, a device may have a small memory capacity, which reduces the cost of the device. To reduce memory consumption, a publisher is adapted to publish messages on a topic that is generated using a publisher identifier, which is a value that is known to the publisher. The generated topic contains the publisher identifier. Thus, a topic for publication is dynamically generated instead of being stored on the publisher, thereby reducing memory consumption of the publisher. The subscribers are subscribed to a different topic than a topic to which the messages are published. Specifically, the subscribers are subscribed to a topic that contains a subscriber identifier. Similar to the publisher identifier, the subscriber identifier is a value known to the subscribers. Each of the subscribers may utilize the same subscriber identifier.

The topic mapper is adapted to intercept a message from a publisher and rewrite the topic of the message before the message is routed to subscribers. Specifically, the topic mapper receives a message, modifies the original topic of the message, and then sends the message for delivery to subscribers that are subscribed to the modified topic. Thus, the message delivered to subscribers includes the modified topic and the original payload. The topic mapper modifies the topic of a message based on the presence of a publisher identifier in the original topic. Specifically, the topic mapper detects the presence of a publisher identifier for a publisher in the topic, and then replaces the publisher identifier with a corresponding subscriber identifier for the subscribers. Accordingly, a message may be delivered from a publisher to a subscriber without the publisher knowing the subscriber identifier of the subscribers. Avoiding storage of the subscriber identifier on the publisher helps reduce memory consumption of the publisher.

In an example implementation consistent with the features disclosed herein, a publisher is an Internet of Things (IoT) device, and a subscriber is a user device (e.g., a smartphone, tablet, etc.) that consumes data from the IoT device. For example, the IoT device may be a sensor, and the user device may consume sensor readings from the sensor. The IoT device sends data to the user device by publishing messages including the data to the message broker for delivery to user device.

The messages are published on a different topic than a topic to which the user device is subscribed. In an example implementation, the user device is subscribed to a topic that includes a user identifier, while the IoT device publishes messages on a topic that includes a gateway identifier. The user identifier is an identifier of the user/owner of the user device, such as a customer number of the user. The gateway identifier is an identifier of an IoT gateway for the IoT device, such as a hardware address of the IoT gateway, a geographic location of the IoT gateway, etc. The topic mapper includes a mapping of the gateway identifier to the user identifier. When the IoT device publishes a message on the topic that includes the gateway identifier, the topic mapper modifies the topic of the message by replacing the gateway identifier with the user identifier. The message is then sent to the user device, which is subscribed to the topic that includes the user identifier. As subsequently described in greater detail, the topic mapper may be a standalone device that is separate from the message broker, or may be a plugin for the message broker (e.g., the topic mapper may be an MQTT plugin when the message broker is part of an MQTT system).

Utilizing the topic mapper to modify the topic of messages may advantageously allow for flexible message coupling between an IoT device and a user device, as the IoT device may publish messages for delivery to the user device without knowing the user identifier of the user device. Accordingly, the user identifier may not be stored on the IoT device, reducing memory consumption of the IoT device. Further, provisioning of an IoT device/gateway (e.g., pairing of the IoT device/gateway with a user device) may be performed at the topic mapper instead of at the IoT device/gateway. In an example implementation, the topic mapper is part of a cloud service managed by a seller of IoT devices/gateways, and an IoT gateway, when sold to a customer, is mapped to the customer by the seller at the topic mapper. As a result, IoT devices that the customer connects to the IoT gateway may be used by the customer without on-site provisioning by the customer. Further, an IoT device may be easily moved between customers by moving the IoT device between the IoT gateways of the customers.

FIG. 1 is a block diagram of a publish-subscribe messaging system 100, according to some implementations. The publish-subscribe messaging system 100 includes a message broker 102, a publisher 104, subscribers 106, and a topic mapper 110. Additionally, the publish-subscribe messaging system 100 optionally includes a mapping manager 112. The message broker 102 receives a message from a publisher 104 and delivers the message to the subscribers 106.

The message broker 102, the publisher 104, the subscribers 106, the topic mapper 110, and the mapping manager 112 may each include a suitable components. Suitable components include a processor, an application-specific integrated circuit, a microcontroller, memory, and the like. The message broker 102, the publisher 104, the subscribers 106, the topic mapper 110, and the mapping manager 112 may each be physical devices, e.g., computers. For example, the topic mapper 110 may include a processor 114 and a memory 116. The memory 116 may be a non-transitory computer readable medium that stores programming for execution by the processor 114. Although not separately illustrated, it should be appreciated that the message broker 102, the publisher 104, the subscribers 106, and the mapping manager 112 may include similar components. One or more modules within the message broker 102, the publisher 104, the subscribers 106, the topic mapper 110, or the mapping manager 112 may be partially or wholly embodied as software and/or hardware for performing any functionality described herein. For example, they may be embodied as software, which is deployed to corresponding worker nodes using a suitable containerization technique, such as Docker®.

The message broker 102, the publisher 104, the subscribers 106, and the topic mapper 110 may implement a machine-to-machine network protocol for message queuing. The network protocol may run over a transport protocol such as TCP/IP. An example of such a network protocol is Message Queuing Telemetry Transport (MQTT). Alternatively, another network protocol such as Kafka may be utilized.

The publisher 104 publishes a message by connecting to the message broker 102 via a network protocol, optionally authenticating with the message broker 102, and then sending message data in a suitable format to the message broker 102 via the network protocol. The message data includes a topic name and a payload. The topic name may be a string. The payload may be binary data, text data, or the like.

In the example implementation of FIG. 1, the publish-subscribe messaging system 100 is utilized for one-to-many communication, in which a single publisher 104 sends a message to multiple subscribers 106. The publish-subscribe messaging system 100 may also be utilized for many-to-one communication, in which multiple publishers 104 send messages to a single subscriber 106. The publish-subscribe messaging system 100 may also be utilized for many-to-many communication, in which multiple publishers 104 send messages to multiple subscribers 106.

The publisher 104 publishes messages to the message broker 102 on a first topic 108A. The subscribers 106 are subscribed to a second topic 108B, which is different from the first topic 108A. The topic mapper 110 is adapted to intercept a message published on the first topic 108A, rewrite the topic of the message to the second topic 108B, and then cause the message broker 102 to deliver the message to the subscribers 106 that are subscribed to the second topic 108B. As a result, the publisher 104 may publish messages on a different topic than a topic to which the subscribers 106 are subscribed. Messages may thus be routed from the publisher 104 to the subscribers 106 without the publisher 104 knowing which topic the subscribers 106 are subscribed to, and without the subscribers 106 knowing which topic the publisher 104 is publishing on.

The first topic 108A includes a publisher identifier, which is a first identifier that is associated with the publisher 104. The second topic 108B includes a subscriber identifier, which is a second identifier that is associated with the subscribers 106. The same second identifier is associated with each of the subscribers 106. As subsequently described in greater detail, a publisher 104 may be an IoT device, a publisher identifier may be a gateway identifier for an IoT gateway of the IoT device, a subscriber 106 may be a user device, and a subscriber identifier may be a user identifier for the user device. The topic mapper 110 includes a mapping of the publisher identifier to the subscriber identifier. When the topic of a message includes the first identifier, the topic mapper 110 rewrites the topic by replacing the first identifier of the first topic 108A with the second identifier of the second topic 108B. In an example implementation, the topic mapper 110 includes identifier mappings in a database. For example, the database may include an identifier mapping table, where the identifier mapping table includes a publisher identifier column and a subscriber identifier column. The database may be stored in the memory 116 of the topic mapper 110 or may be stored external to the topic mapper 110.

The mapping manager 112 manages the mappings of the publisher identifiers and the subscriber identifiers for the topic mapper 110. For example, when the identifier mappings are stored in a database, the database may be accessible to the mapping manager 112 such that the mapping manager 112 may create, update, or delete identifier mappings. Accordingly, the identifier mappings may be managed separately from the topic mapper 110. For example, the identifier mappings may be managed via a user interface on a device that is different than the device operating the topic mapper 110. As subsequently described in greater detail, the mapping manager 112 may create the identifier mappings in response to receiving information from a seller of an IoT gateway.

The topic mapper 110 may be implemented in several manners. In a first example implementation, the topic mapper 110 is separate from the message broker 102, such that the message broker 102 and the topic mapper 110 are provided by different devices. In such an implementation, the message broker 102 and the topic mapper 110 may communicate via a suitable network protocol. In a second example implementation, the topic mapper 110 is part of the message broker 102, such that the message broker 102 and the topic mapper 110 are provided by the same device. In such an implementation, the topic mapper 110 may be a plugin for the message broker 102, and the message broker 102 and the topic mapper 110 may communicate via a suitable application programming interface (API).

Figure 2:
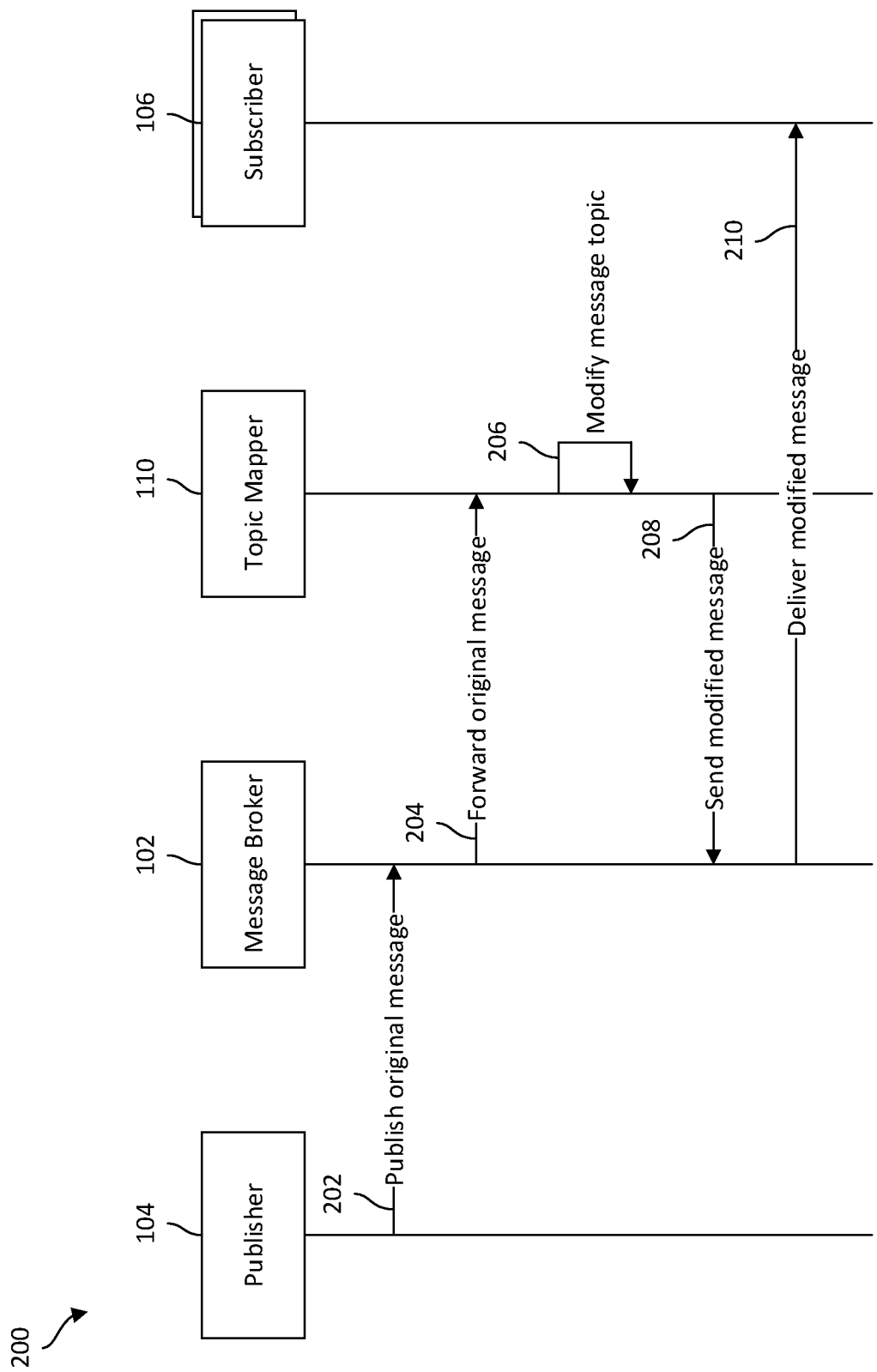
FIG. 2 is a protocol diagram of a message delivery method, according to some implementations.

FIG. 2 is a protocol diagram of a message delivery method 200, according to some implementations. The message delivery method 200 is performed when routing a message from a publisher 104 to one or more subscribers 106 via a message broker 102 and a topic mapper 110.

In step 202, the publisher 104 publishes an original message (or more generally, a first message) to the message broker 102. The original message includes a topic and a payload. The topic of the original message is different than a topic to which the subscribers 106 are subscribed. Specifically, the topic of the original message includes a publisher identifier of the publisher 104.

In step 204, the message broker 102 forwards the original message to the topic mapper 110. When the message broker 102 is implemented with a different device than the topic mapper 110, the message broker 102 may forward the original message to the topic mapper 110 via a suitable network protocol. When the message broker 102 is implemented with the same device as the topic mapper 110 (e.g., when the topic mapper 110 is implemented as a plugin for the message broker 102), the message broker 102 may forward the original message to the topic mapper 110 via a suitable application programming interface (API).

In step 206, the topic mapper 110 modifies the topic of the original message to produce a modified message (or more generally, a second message). The topic mapper 110 modifies the topic by first mapping the publisher identifier to a subscriber identifier of the subscribers 106 and then replacing the publisher identifier in the topic with the subscriber identifier. Thus, the topic of the modified message includes the subscriber identifier. The topic mapper 110 maps the publisher identifier to the subscriber identifier by looking up the subscriber identifier using the publisher identifier. For example, when the identifier mappings are stored in a database having an identifier mapping table, the subscriber identifier is looked up by searching for a row in the identifier mapping table that includes the publisher identifier. The modified message includes the same payload as the original message, but a different topic than the original message.

In step 208, the topic mapper 110 sends the modified message to the message broker 102. When the message broker 102 is implemented with a different device than the topic mapper 110, the topic mapper 110 may send the modified message to the message broker 102 via a suitable network protocol. When the message broker 102 is implemented with the same device as the topic mapper 110 (e.g., when the topic mapper 110 is implemented as a plugin for the message broker 102), the topic mapper 110 may send the modified message to the message broker 102 via a suitable application programming interface (API).

In step 210, the message broker 102 delivers the modified message to the subscribers 106. The topic of the modified message is the topic to which the subscribers 106 are subscribed. Specifically, the topic of the modified message includes the subscriber identifier of the subscribers 106. Thus, while the original message is published to a different topic than that of the modified message, the payload of the original message is still delivered to the subscribers 106.

In an example implementation, the network protocol utilized for communication between the message broker 102 and the topic mapper 110 is the same machine-to-machine network protocol used for communication between the publisher 104 and the subscribers 106. Specifically, the topic mapper 110 may act as a subscriber that is subscribed to multiple topics, such that the topic mapper 110 receives all messages published on specific topics of the message broker 102. For example, the topic mapper 110 may subscribe to all topics, such that the topic mapper 110 receives all messages published on the message broker 102. The topic mapper 110, upon receiving a message, may modify the topic of the message as previously described. The topic mapper 110 may then send the modified message to the subscribers 106 by republishing the modified message on the message broker 102, such that it is delivered to the subscribers 106 that are subscribed to the topic of the modified message.

The message delivery method 200 may be utilized in an IoT system. In such an example implementation, the publisher 104 is an IoT device, and the subscribers 106 are user devices that consume data from the IoT device. The message broker 102 facilitates the delivery of data (in the form of messages) from the IoT device to the user devices.

Figure 3:
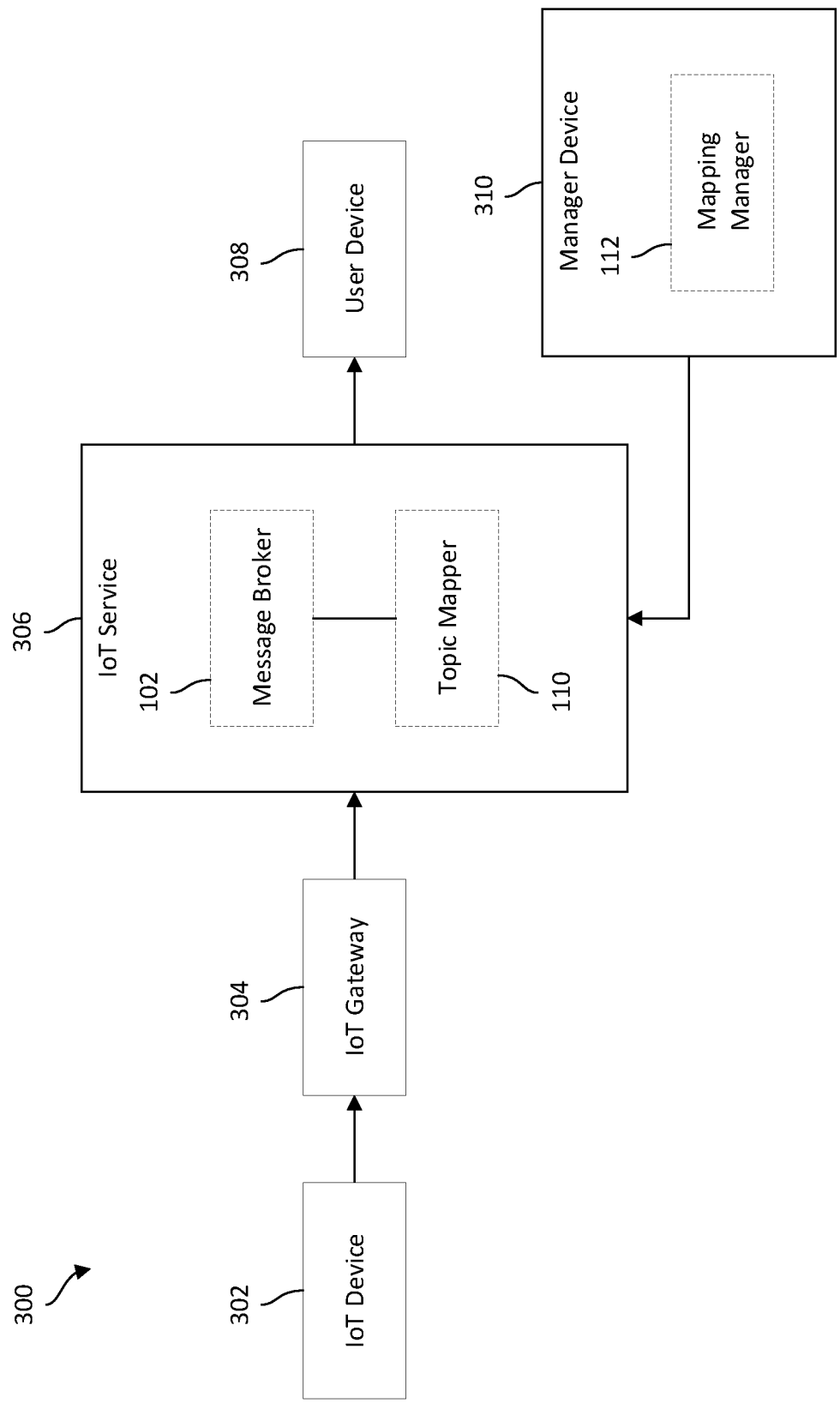
FIG. 3 is a block diagram of an IoT system, according to some implementations.

FIG. 3 is a block diagram of an IoT system 300, according to some implementations. The IoT system 300 includes an IoT device 302, an IoT gateway 304, an IoT service 306, a user device 308, and a manager device 310. The IoT device 302, the IoT gateway 304, and the IoT service 306 may each be part of an IoT application that will be accessed by the user device 308 and managed by the manager device 310.

The IoT device 302 is a device that supports internet connectivity. Thus, the IoT device 302 may communicate with the user device 308 via the internet, such as through a cloud service. For example, the IoT device 302 may be a sensor, camera, lock, button, light bulb, alarm, or the like. In an example implementation, the IoT device 302 is a device having limited computing resources (e.g., small processing power, memory capacity, etc.), such as a temperature sensor, which may (or may not) be a battery-powered device. The IoT device 302 includes a radio and is adapted to wirelessly communicate with the IoT gateway 304.

The IoT gateway 304 is a hub for one or more IoT devices, including the IoT device 302. The IoT gateway 304 connects the IoT device 302 to the IoT service 306 (e.g., via the internet) for data processing and transmission. Thus, the IoT gateway 304 may enable device-to-cloud communications for the IoT device 302. Performing device-to-cloud communications at the IoT gateway 304 instead of directly at the IoT device 302 may be advantageous when the IoT device 302 is a battery-powered device having limited computing resources. The IoT gateway 304 includes a radio and is adapted to wirelessly communicate with the IoT device 302 using a suitable wireless protocol. Suitable wireless protocols include such as Bluetooth Low Energy (BLE), Wi-Fi, Long Range (LoRa) wireless, Long-Term Evolution (LTE), 5G, and the like. In an example implementation, the IoT gateway 304 and the IoT device 302 may communicate over an existing wireless local area network (WLAN). In another example implementation, the IoT gateway 304 creates a low-power, wide-area network (LPWAN) for the IoT device 302.

The IoT service 306 is connected to the IoT device 302 via the IoT gateway 304. The IoT service 306 may be a cloud service or the like, adapted to perform data collection and/or data processing for the IoT device 302. For example, when the IoT device 302 is a temperature sensor, the IoT service 306 may perform monitoring of the temperature sensor.

The user device 308 is connected to the IoT service 306. The user device 308 may access a user interface for the IoT application at the IoT service 306. Thus, the user device 308 may communicate with the IoT service 306 via the internet. For example, the user device 308 may be a smartphone, tablet, personal computer (PC), or the like. Continuing the example where the IoT device 302 is a temperature sensor, the user device 308 may access the IoT service 306 to view the sensor readings from the temperature sensor.

The manager device 310 is connected to the IoT service 306. The IoT application may be managed by the manager device 310. The manager device 310 may access a manager interface for the IoT application at the IoT service 306. Thus, the manager device 310 may communicate with the IoT service 306 via the internet. For example, the manager device 310 may be a smartphone, tablet, personal computer (PC), or the like. Continuing the example where the IoT device 302 is a temperature sensor, the manager device 310 may access the IoT service 306 to manage the configuration of the temperature sensor.

The IoT system 300 implements the publish-subscribe messaging system 100 (see FIG. 1) for communication between the IoT device 302 and the user device 308. In such an implementation, the IoT device 302 acts as a publisher 104 (see FIG. 1) and the user device 308 acts as a subscriber 106 (see FIG. 1). Additionally, the IoT service 306 acts as a message broker 102 and a topic mapper 110 (see FIG. 1) for routing messages from the IoT device 302 to the user device 308. The manager device 310 acts as a mapping manager 112 (see FIG. 1) for managing the topic mapper 110.

Figure 4:
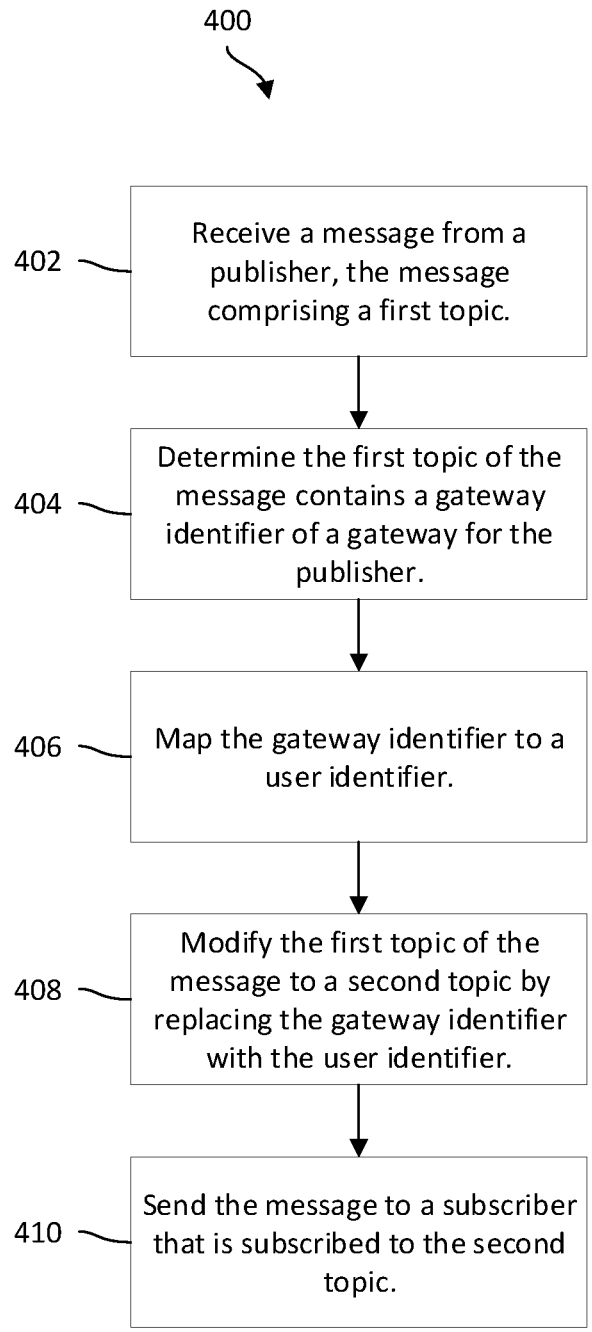
FIG. 4 is a diagram of a message mapping method, according to some implementations.

FIG. 4 is a diagram of a message mapping method 400, according to some implementations. The message mapping method 400 will be described in conjunction with FIG. 3. The message mapping method 400 may be performed by the topic mapper 110 of the IoT service 306 during message delivery in the IoT system 300. As a result, messages in the IoT system 300 may be routed to the user device 308 even if they are published, by the IoT device 302, on a different topic than a topic to which the user device 308 is subscribed.

In step 402, the topic mapper 110 receives a message from a publisher (e.g., the IoT device 302). The message includes a first topic and a payload, and is received via the message broker 102. The first topic includes a gateway identifier of an IoT gateway 304 for the IoT device 302. The IoT device 302 may generate the first topic for the message according to the identifier of its IoT gateway 304. A message topic is a string that includes one or more topic levels, with each topic level being separated by a topic separator. A topic separator may be a character such as a forward slash. For example, when the IoT device 302 is a sensor, the first topic may be "/{gwid}/home/room/light1" (where "{gwid}" is the gateway identifier).

In step 404, the topic mapper 110 determines the first topic of the message includes a gateway identifier of the IoT gateway 304 for the publisher (e.g., the IoT device 302). This may be accomplished by determining whether the first topic (which is a string) matches a regular expression that matches the gateway identifier. For example, the match pattern for regular expression matching may include the gateway identifier. In implementations where the identifier mappings are stored in an identifier mapping table of a database, the topic mapper 110 may search the identifier mapping table and the first topic of the message to determine whether the first topic includes any of the gateway identifiers in the identifier mapping table.

The gateway identifier may be any identifier that is locally or globally unique to the IoT gateway 304. In an example implementation, the gateway identifier is a hardware address of the IoT gateway 304. For example, the gateway identifier may include a Media Access Control (MAC) address of the IoT gateway 304. In another example implementation, the gateway identifier is a geographic location of the IoT gateway 304. For example, the gateway identifier may include a latitude and a longitude of the gateway.

In step 406, the topic mapper 110 maps the gateway identifier to a user identifier. This may be accomplished by looking up the user identifier using the gateway identifier. In implementations where the identifier mappings are stored in an identifier mapping table of a database, the topic mapper 110 may select the user identifier from a row in the identifier mapping table where the row includes the gateway identifier. In implementations where the gateway identifier is a hardware address of the IoT gateway 304, the identifier mapping table may include a mapping of gateway hardware addresses to user identifiers. In implementations where the gateway identifier is a geographic location of the IoT gateway 304, the identifier mapping table may include a mapping of gateway geographic locations to user identifiers.

The user identifier may be any identifier that is locally or globally unique to the user device 308. In an example implementation, the user identifier is an identifier of the user/owner of the user device 308, such as a customer number of the user. In an IoT application, the user identifier may be the customer number of a user account in the IoT application.

In step 408, the topic mapper 110 modifies the first topic of the message to a second topic by replacing the gateway identifier with the user identifier. The replacement may be accomplished by performing a string search and replace. Continuing the previous example, if first topic is "/{gwid}/home/room/light1" (where "{gwid}" is the gateway identifier) then the second topic may be "/{uid}/home/room/light1" (where "{uid}" is the user identifier). Accordingly, the gateway identifier in the message topic is replaced with the user identifier. After the topic is modified, the message includes the second topic and the original payload.

In step 410, the topic mapper 110 sends the message to a subscriber (e.g., the user device 308). The user device 308 is subscribed to the second topic, which is different than the first topic. The message is sent to the user device 308 via the message broker 102. The user device 308 may be one of a plurality of devices of the user that are subscribed to the second topic.

Utilizing the topic mapper 110 to modify the topic of messages may be advantageous. The IoT device 302 may publish a message for delivery to the user device 308 without the IoT device 302 knowing the user identifier of the user device 308. In an example implementation, the IoT device 302 is adapted to automatically generate the first topic of the message according to the identifier of its IoT gateway 304. Thus, the IoT device 302 and the IoT gateway 304 may advantageously be deployed without being provisioned with the user identifier of the user device 308. Instead, provisioning (e.g., pairing of the IoT device 302 or the IoT gateway 304 with the user device 308) may be performed at the topic mapper 110. Additionally, an IoT device 302 may be freely moved between customer sites, and will automatically send messages to the appropriate user device 308 for a customer site. Accordingly, an IoT device 302 may be used without customer-initiated provisioning if the IoT gateway 304 of the customer is registered with the topic mapper 110.

Figure 5:
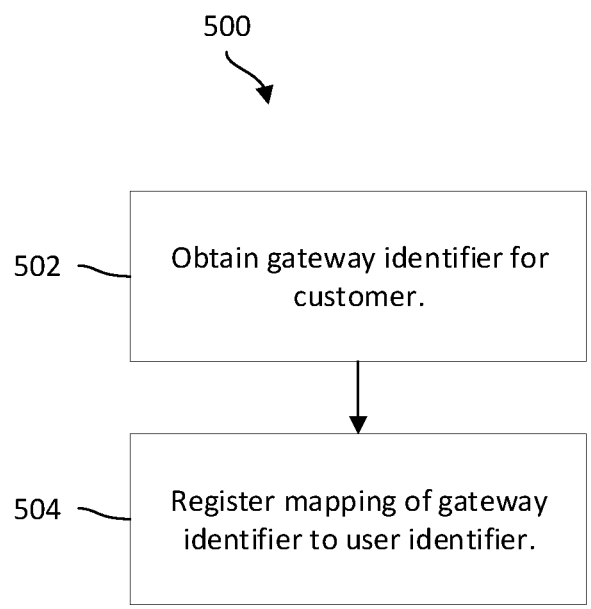
FIG. 5 is a diagram of a topic mapper provisioning method, according to some implementations.

FIG. 5 is a diagram of a topic mapper provisioning method 500, according to some implementations. The topic mapper provisioning method 500 will be described in conjunction with FIG. 4. The topic mapper provisioning method 500 may be performed by the mapping manager 112 of the manager device 310 during the provisioning of a particular gateway and customer. In an example implementation, the topic mapper provisioning method 500 is performed by a seller of an IoT device 302 or an IoT gateway 304, so that the IoT device 302 and the IoT gateway 304 may be used by a customer without on-site provisioning.

In step 502, the mapping manager 112 obtains a gateway identifier for a customer. The gateway identifier is an identifier of an IoT gateway 304 that is owned by the customer and used at the customer's site. In an example implementation, the gateway identifier is a hardware address of the IoT gateway 304. The hardware address may be provided by the customer (e.g., via a user interface), inferred based on the customer's purchase history (e.g., from a previous purchase of an IoT gateway 304), or the like. In another example implementation, the gateway identifier is a geographic location of the IoT gateway 304. The geographic location may be provided by the customer (e.g., via a user interface), inferred based on information provided by the customer (e.g., by looking up the geographic location using the customer's shipping/billing address), or the like.

In step 504, the mapping manager 112 registers a mapping of the gateway identifier to a user identifier for the customer. In an example implementation, the user identifier is a customer number of the user/customer, which is a known value. When the topic mapper 110 includes a database having an identifier mapping table, the identifier mapping may be registered by inserting a row including the gateway identifier and the customer number into the identifier mapping table. In an example implementation, the database is directly accessible by the mapping manager 112, and so the mapping manager 112 may execute a query against the database to insert the mapping. In another example implementation, the mapping manager 112 and the topic mapper 110 may communicate via a suitable application programming interface (API).

Other variation are possible. In another example implementation, an identifier mapping further includes particular topic levels in addition to the identifiers. For example, the mapping may include a first topic string (that includes the gateway identifier and first topic levels) and a second topic string (that includes the user identifier and second topic levels). A message topic may only be modified if it includes both a gateway identifier and the specified topic levels. For example, the mapping may map "/{gwid}/home/room/light1" (where "{gwid}" is the gateway identifier) to "/{uid}/home/room/light1" (where "{uid}" is the user identifier). In such an example, the message topic may only be modified if it includes both the topic level "/home/room/light1" and the gateway identifier. In such an implementation, the topic mapper 110 may be configured with API parameters such as ("/{gwid}/home/room/light1", "/{uid}/home/room/light1", "{gwid}"). Such a call instructs the topic mapper 110 to intercept messages sent to the topic "/{gwid}/home/room/light1" and rewrite the topic to "/{uid}/home/room/light1" when "{gwid}" is detected in the topic string.

Various features may achieve advantages. Utilizing the topic mapper 110 to provision an IoT device/gateway may relieve a customer from provisioning the IoT device/gateway. Convenience for the customer and user experience may thus be improved. Additionally, as previously noted, the IoT device 302 may be a battery-powered device having limited computing resources. Performing provisioning at the topic mapper 110 may relieve the IoT device 302 from storing the user identifier. Memory usage of the IoT device 302 may thus be reduced, which may be particularly advantageous when the IoT device 302 has limited computing resources. The functionality of the IoT device 302 may thus be improved.

In an example implementation consistent with the features disclosed herein, a method includes: receiving a message from a publisher, the message including a first topic; determining the first topic of the message includes a gateway identifier of a gateway for the publisher; mapping the gateway identifier to a user identifier; modifying the first topic of the message to a second topic by replacing the gateway identifier with the user identifier; and sending the message to a subscriber that is subscribed to the second topic. In another example implementation of the method, the gateway identifier is a hardware address of the gateway. In another example implementation of the method, the hardware address is a Media Access Control (MAC) address of the gateway. In another example implementation of the method, the gateway identifier is a geographic location of the gateway. In another example implementation of the method, the geographic location includes a latitude and a longitude of the gateway. In another example implementation of the method, the publisher is an Internet of Things device and the gateway is an Internet of Things gateway for the Internet of Things device. In another example implementation of the method, determining the first topic of the message includes the gateway identifier includes: determining whether the first topic matches a regular expression, the regular expression matching the gateway identifier. In another example implementation of the method, mapping the gateway identifier to the user identifier includes: selecting the user identifier from a row in an identifier mapping table of a database, where the row includes the gateway identifier. In another example implementation, the method further includes: registering an identifier mapping of the gateway identifier to the user identifier.

In an example implementation consistent with the features disclosed herein, a system includes: a sensor; a gateway for the sensor; and a topic mapper including a first processor and a first non-transitory computer readable medium storing instructions which, when executed by the first processor, cause the first processor to: receive a message from the sensor, the message including a first topic and a payload, the first topic including a gateway identifier of the gateway; obtain an identifier mapping of the gateway identifier to a user identifier of a user of the sensor; modify the first topic of the message to a second topic by replacing the gateway identifier with the user identifier; and send the message to a user device that is subscribed to the second topic. In another example implementation, the system further includes: a message broker including a second processor and a second non-transitory computer readable medium storing instructions which, when executed by the second processor, cause the second processor to: forward the message from the sensor to the topic mapper via a network protocol. In another example implementation of the system, the user device is one of a plurality of devices of the user that are subscribed to the second topic. In another example implementation of the system, the user identifier is a customer number of the user. In another example implementation, the system further includes: a mapping manager including a second processor and a second non-transitory computer readable medium storing instructions which, when executed by the second processor, cause the second processor to: create the identifier mapping in response to receiving information from a seller of the gateway. In another example implementation of the system, the identifier mapping is created in a database, the database stored in a memory of the topic mapper.

In an example implementation consistent with the features disclosed herein, a non-transitory computer readable medium stores instructions which, when executed by a processor, cause the processor to: receive a message from a sensor, the message including a first topic, the first topic including a gateway identifier of a gateway for the sensor;

map the gateway identifier to a user identifier; modify the first topic of the message to a second topic by replacing the gateway identifier with the user identifier; and send the message to a subscriber that is subscribed to the second topic. In another example implementation of the non-transitory computer readable medium, the gateway identifier is a Media Access Control (MAC) address of the gateway. In another example implementation of the non-transitory computer readable medium, the gateway identifier includes a latitude and a longitude of the gateway. In another example implementation, the non-transitory computer readable medium further stores instructions which, when executed by the processor, cause the processor to: determine the first topic of the message includes the gateway identifier by determining whether the first topic matches a regular expression, the regular expression matching the gateway identifier. In another example implementation of the non-transitory computer readable medium, the instructions to map the gateway identifier to the user identifier include instructions to: select the user identifier from a row in an identifier mapping table of a database, the row including the gateway identifier.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method comprising:
    receiving a message from a publisher, the message comprising a first topic, the first topic comprising a first string, a first portion of the first string including a topic level, a second portion of the first string including a gateway identifier of a gateway for the publisher;
    determining the first topic of the message includes the gateway identifier of the gateway for the publisher;
    mapping the gateway identifier to a user identifier;
    modifying the first topic of the message to a second topic by replacing the gateway identifier with the user identifier, the second topic comprising a second string, a first portion of the second string including the topic level, a second portion of the second string including the user identifier; and
    sending the message to a subscriber that is subscribed to the second topic.

2. The method of claim 1, wherein the gateway identifier is a hardware address of the gateway.

3. The method of claim 2, wherein the hardware address is a Media Access Control (MAC) address of the gateway.

4. The method of claim 1, wherein the gateway identifier is a geographic location of the gateway.

5. The method of claim 4, wherein the geographic location comprises a latitude and a longitude of the gateway.

6. The method of claim 1, wherein the publisher is an Internet of Things device and the gateway is an Internet of Things gateway for the Internet of Things device.

7. The method of claim 1, wherein determining the first topic of the message includes the gateway identifier comprises:
    determining whether the first topic matches a regular expression, the regular expression matching the gateway identifier.

8. The method of claim 1, wherein mapping the gateway identifier to the user identifier comprises:
    selecting the user identifier from a row in an identifier mapping table of a database, wherein the row includes the gateway identifier.

9. The method of claim 1, further comprising:
    registering an identifier mapping of the gateway identifier to the user identifier.

10. A system comprising:
    a sensor;
    a gateway for the sensor; and
    a topic mapper comprising a first processor and a first non-transitory computer readable medium storing instructions which, when executed by the first processor, cause the first processor to:
        receive a message from the sensor, the message comprising a first topic and a payload, the first topic comprising a first string, a first portion of the first string including a topic level, a second portion of the first string including a gateway identifier of the gateway;
        obtain an identifier mapping of the gateway identifier to a user identifier of a user of the sensor;
        modify the first topic of the message to a second topic by replacing the gateway identifier with the user identifier, the second topic comprising a second string, a first portion of the second string including the topic level, a second portion of the second string including the user identifier; and
        send the message to a user device that is subscribed to the second topic.

11. The system of claim 10, further comprising:
    a message broker comprising a second processor and a second non-transitory computer readable medium storing instructions which, when executed by the second processor, cause the second processor to:
        forward the message from the sensor to the topic mapper via a network protocol.

12. The system of claim 10, wherein the user device is one of a plurality of devices of the user that are subscribed to the second topic.

13. The system of claim 10, wherein the user identifier is a customer number of the user.

14. The system of claim 10, further comprising:
    a mapping manager comprising a second processor and a second non-transitory computer readable medium storing instructions which, when executed by the second processor, cause the second processor to:
        create the identifier mapping in response to receiving information from a seller of the gateway.

15. The system of claim 14, wherein the identifier mapping is created in a database, the database stored in a memory of the topic mapper.

16. A non-transitory computer readable medium storing instructions which, when executed by a processor, cause the processor to:
    receive a message from a sensor, the message comprising a first topic, the first topic comprising a first string, a first portion of the first string including a topic level, a second portion of the first string including a gateway identifier of a gateway for the sensor;
    map the gateway identifier to a user identifier;
    modify the first topic of the message to a second topic by replacing the gateway identifier with the user identifier, the second topic comprising a second string, a first portion of the second string including the topic level, a second portion of the second string including the user identifier; and send the message to a subscriber that is subscribed to the second topic.

17. The non-transitory computer readable medium of claim 16, wherein the gateway identifier is a Media Access Control (MAC) address of the gateway.

18. The non-transitory computer readable medium of claim 16, wherein the gateway identifier comprises a latitude and a longitude of the gateway.

19. The non-transitory computer readable medium of claim 16, further storing instructions which, when executed by the processor, cause the processor to:
   determine the first topic of the message includes the gateway identifier by determining whether the first topic matches a regular expression, the regular expression matching the gateway identifier.

20. The non-transitory computer readable medium of claim 16, wherein the instructions to map the gateway identifier to the user identifier comprise instructions to:
   select the user identifier from a row in an identifier mapping table of a database, the row including the gateway identifier.

\* \* \* \* \*